United States Patent Office 3,470,749
Patented Oct. 7, 1969

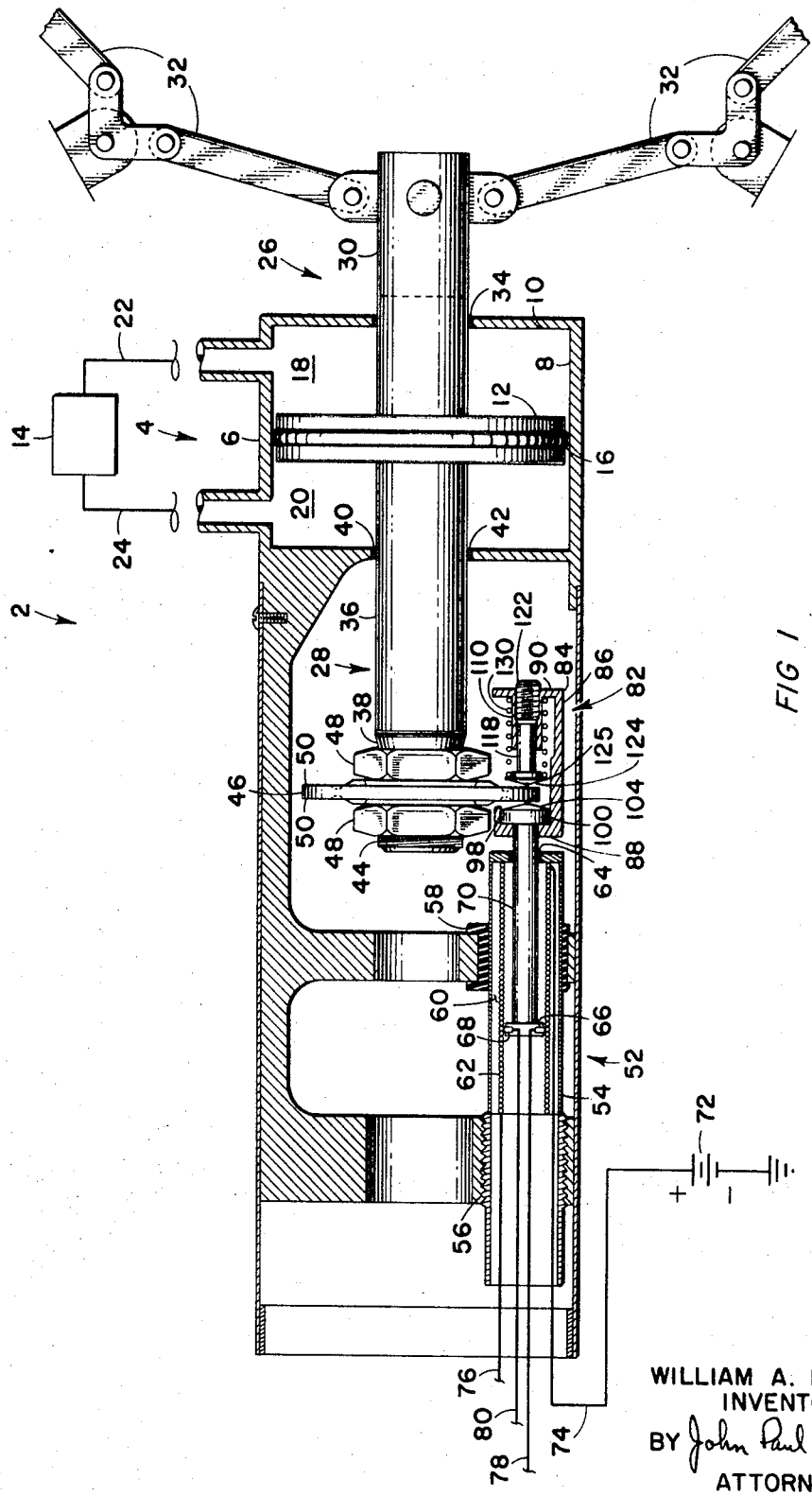

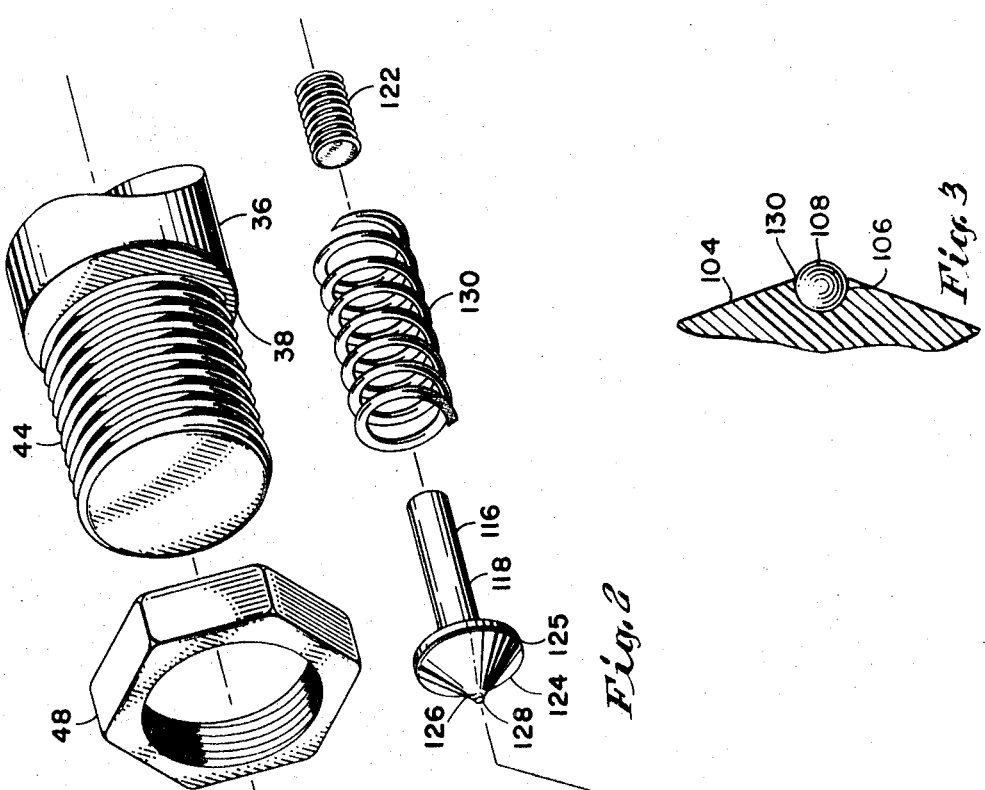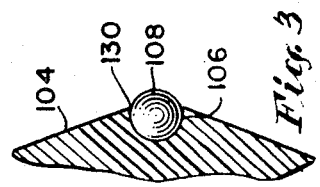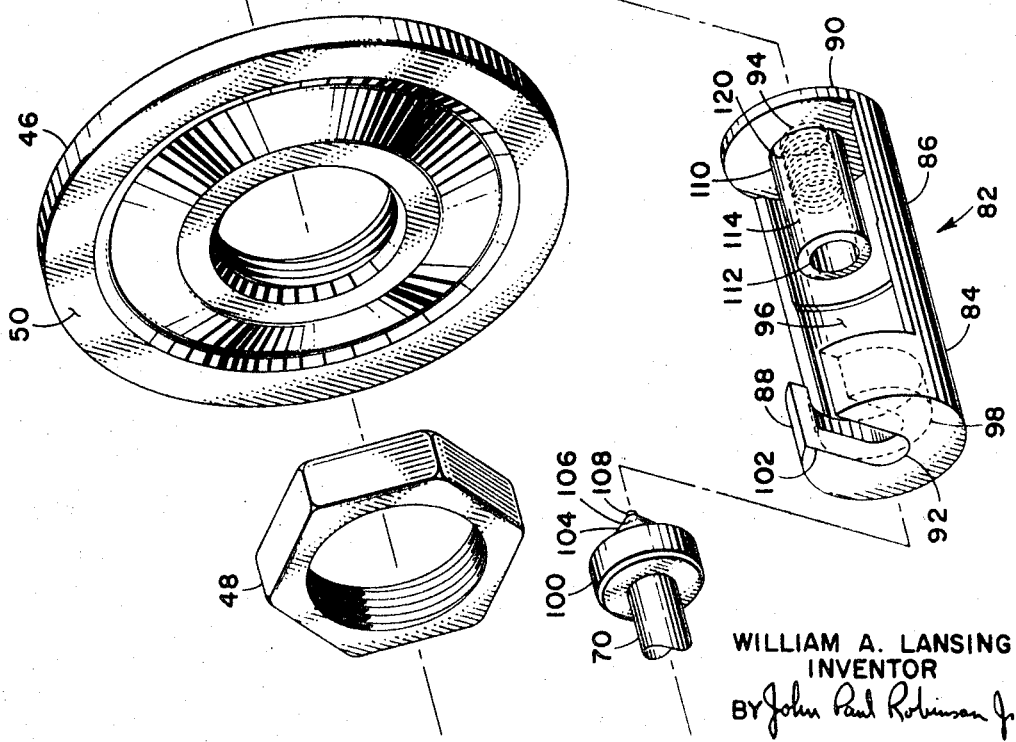

3,470,749
MOTION TRANSFER DEVICE
William A. Lansing, Arlington, Tex., assignor to LTV Aerospace Corporation, Dallas, Tex., a corporation of Delaware
Filed Nov. 22, 1967, Ser. No. 685,201
Int. Cl. F16h 37/00
U.S. Cl. 74—1         18 Claims

ABSTRACT OF THE DISCLOSURE

A self-aligning motion transfer device resiliently interconnecting a reciprocable shaft assembly to a potentiometer construction that effectively monitors the linear displacement of the shaft assembly. The motion transfer device includes biasing means yieldably urging a portion of the potentiometer slider toward the shaft assembly and into an aligned, motion-transfer relationship therewith, the biasing means permitting rotation of the shaft assembly relative to the potentiometer, thereby preventing destruction or damage to said potentiometer.

---

The present invention relates to improvements in motion-transfer mechanisms and more particularly to a continuously self-aligning motion transfer device interconnecting a reciprocable shaft with an electrical apparatus that monitors the linear displacement of the shaft.

In the past, numerous and extensive efforts have been undertaken to develop a satisfactory motion-transfer device, pot drive assembly or suitable linkage that was usually positioned interjacent and interconnecting a movable member, for example, an actuator shaft to an electrical apparatus. Generally, the electrical apparatus was of the type that provided an electromotive signal which varied in proportion to movement of the actuator rod and thereby indicated the relative position of the movable actuator rod. These actuators are well known devices which are widely used for a variety of functions, such as positioning control surfaces of aircraft and missiles, actuating valves, steering vehicles and many other similar operations. The electromotive signal generated by movement of the actuator rod usually was employed to actuate a continuous recorder or instrument which visually or in some other manner would indicate the position of the actuator rod within its limited range of travel. Therefore, such electrical apparatus, as described, indicated the position of an aircraft control surface or the position of other mechanisms moved by the actuator. Likewise, the electromotive signal produced by such electrical apparatus could be employed to actuate a transducer or servo control that is operatively associated with the actuator.

The principal defect of these prior art systems is that a potentiometer, which was usually employed, generally required a relatively expensive mounting device for exact alignment of the potentiometer slider with the actuator shaft. Since potentiometers are of extremely delicate construction, an extremely accurate, complex, close tolerance, adjustable, potentiometer mounting device was required as any misalignment of the potentiometer slider relative to the actuator rod would result in a moment being imposed thereon, thus causing immediate or imminent destruction of the potentiometer. Also, the reciprocable actuator rod was required to have a special configuration or be guided by special devices which restrained rotation of the rod, to prevent destruction of the rod, to prevent destruction of the potentiometer. In an effor to solve and/or minimize the problems occasioned by these disadvantages, extremely intricate and refined potentiometer mounting devices have been constructed, and while these mounting devices have lessened the problems somewhat, a satisfactory solution has not previously been discovered.

In addition, efforts have been made to mount the potentiometer within the associated actuator for reducing mechanical injuries thereto. This expedient has, to some extent, alleviated casual damages to the potentiometer; however, the increased complexity in design, cost, construction and maintenance leave much to be desired and the same problems with respect to alignment of the potentiometer slider and actuator shaft rotation, as described in the preceding paragraph were likewise encountered.

The primary object of the present invention is concerned with the provision of a new and improved continuously self-aligning motion-transfer mechanism designed to maintain an uninterrupted motion transfer relationship between a reciprocable shaft assembly and an electrical apparatus that monitors the linear displacement of the shaft assembly and simultaneously compensates for initial or dynamic misalignment of either the shaft assembly or said electrical apparatus.

Another object of the present invention is to provide a lightweight, compact actuator construction having a resilient motion transfer device interconnecting the actuator shaft assembly to a potentiometer that monitors the linear displacemen of the shaft assembly, with said motion transfer device including biasing means constantly urging a portion of the potentiometer into a predetermined motion-transfer relationship with the shaft assembly.

A further object of this invention is to provide a new and improved self-aligning, rugged, simplified, compact motion-transfer device which permits rotation of the actuator shaft relative to the potentiometer for greatly reducing casual damage thereto.

Other objects and advantages will be apparent from the specification and claims and from the accompanying drawing illustrative of the invention.

In the drawing:

FIGURE 1 is a cross-sectional view in elevation illustrating one embodiment of the present motion-transfer device.

FIGURE 2 is an exploded, perspective view showing the component parts of the subject motion-transfer device.

FIGURE 3 shows the means for retaining an anti-friction bearing.

Certain terminology will be used in the following description for convenience in reference only and is not intended to be limiting. The words "upwardly," "downwardly," "rightwardly" and "leftwardly" will designate directions in the drawing to which reference is made. The words "inwardly" and "outwardly" will refer to directions toward and away from a geometric axis of the actuator construction. Such terminology will include the words specifically mentioned, derivatives thereof, and words of similar import.

For the purpose of disclosure of the continuously self-aligning motion-transfer device embodying the present invention, reference is now made to FIG. 1 which shows an actuator assembly 2 having a fluid-operated actuator mechanism 4 which comprises a substantially cylinder-like housing or casing 6 that is provided with an internal cylinder-like wall or surface 8 for defining a piston chamber 10. A piston 12 is constructed and arranged to reciprocate within the confines of chamber 10, in response to a pressure differential being established between opposite sides thereof by a conventional control means 14 which is well known in the art and need not be illustrated or described in detail. A suitable sealing means 16 extends about the outer periphery of piston 12 and effectively seals off the interior of chamber 10 on one side of the piston from that on the other side. Thus, the piston 12 and its cooperating sealing means 16 effectively divides chamber 10 into a first and a second fluid working zone 18 and 20, as shown in FIG. 1, each of which communicate with a conventional fluid reservoir (not shown) through control means 14 and fluid conduits 22 and 24, respectively. The fluid-operated actuator mechanism 4 functions as a means for applying a substantially axially directed force to piston 12 for effecting reciprocal movement thereof. Preferably, a fluid or hydraulic actuator is employed; however, under some circumstances and for other applications, it may be found desirable to utilize other types of actuators which employ mechanical, electrical or other power sources.

A first shaft assembly 26 comprises a first piston shaft or rod 30 fixedly secured on one end portion to one side of piston 12 and with the opposite end portion extending outwardly through a complementary opening in one of the end walls of chamber 10. This opposite end portion may be operatively associated through a plurality of linkage arrangements 32 with the control surfaces of an aircraft, or some other desired apparatus. A conventional sealing means 34 is provided for effecting a fluid seal between rod 30 and the complementary opening in the one end wall of chamber 10, to prevent leakage therefrom. A second shaft assembly 28 includes a second piston shaft or rod 36 fixedly connected on one end portion to the opposite side of piston 12 and with the opposite end portion 38 extending outwardly through a complementary opening 40 in the opposite end wall of chamber 10. A suitable sealing means 42 is provided, adjacent opening 40, for confining a fluid within chamber 10. Both sealing means 34 and 42, additionally, function as means for supporting shaft assembly 26 and 28, respectively. Thus, shaft assembly 26 and 28 are mounted for both reciprocal movement along a longitudinal axis and rotary movement thereabout, relative to sealing means 34 and 42. This rotary movement of shaft assembly 26 and 28 usually results from variances in fabrication tolerances between associated parts of the actuator assembly 2 and connecting linkage arrangement 32. Accordingly, it is apparent that a majority of present day actuators will exhibit a limited angular rotation of their associated shafts, upon reciprocal movement thereof. The opposite end portion 38 has an externally threaded portion 44 adjacent the terminus thereof. A rigid circular disc or reaction member 46 has a centrally disposed opening that is adapted to receive and surround the threaded end portion 44. The disc 46 is secured in fixed relationship on the threaded portion 44, of the shaft 36, by a dual lock nut arrangement, comprising a pair of lock nuts 48 co-acting with the external threads on shaft portion 44 for both locking the disc 46 in a desired position and permitting limited axial adjustment of disc 46 along shaft 36. The outer diameter of disc 46 is, preferably, greater than the outer diameter of shaft 36; however, it may be desirable to have the outer diameter of disc 46 equal to or less than the outer diameter of shaft 36. The disc 46 has a pair of opposite, substantially parallel sidewalls and at least one substantially smooth, outwardly facing, radially extending, uninterrupted surface 50 is concentrically disposed about and positioned on each sidewall of disc 46 adjacent the outer periphery thereof. The disc 46 could be created from sheet metal, or some conventional material by stamping, forging or in some other conventional manner readily apparent to a person of ordinary skill in the metal fabricating art. The surfaces 50 are coated, plated or clad with a relatively hard material such as chrome-moly steel which is subsequently ground and polished by means suitable to produce a substantially mirror-like finish thereon.

An electrical apparatus or potentiometer 52 is provided with a generally cylinder-like housing 54 which is threadedly connected at 56 to the casing 6 and the opposite end is resiliently supported by rubber grommet 58, in such a manner that the longitudinal axis of the potentiometer 52 is substantially parallel to the longitudinal axis of shaft 36. Housing 54 has an inner wall portion defining a hollow compartment or cavity 60 which encloses a variable coil or resistance construction 62 of relatively fine wire which is fixedly attached, by suitable means, to the inner wall portion of cavity 60. At least one opening extends through the inner wall of cavity 60 and is constructed and arranged to receive a bushing 64. A plurality of spaced, opposed, outwardly biased brushes 66 and 68 slidably engage resistance 62 and are carried on one end of elongate, movable slider 70 which is slidably, yet snugly supported by bushing 64, thereby permitting slider 70 to reciprocate in a substantially parallel manner, relative to resistance 62. Bushing 64 additionally serves as a sealing means to preclude the entry of dirt and moisture into cavity 60. A battery 72, or some other conventional means for placing an electromotive force or potential across variable resistance 62, is connected through leads 74 and 76 to opposite ends of resistance 62. The brushes 66 and 68 are electrically connected in a conventional potentiometer circuit (not shown) through leads 78 and 80, respectively. Many different conventional electrical circuits could be utilized in combination with potentiometer 52. Most conventional potentiometer circuits employ the expedient of comparing a first unknown electromotive force with a second, pre-determined, known electromotive force for determining the magnitude of said first electromotive force. A continuous recorder (not shown) or some other means for converting the determined magnitude of the first unknown electromotive force into a linear measurement is usually employed, whereby the linear displacement of the shaft assembly 26 is accurately indicated.

Having thus described both the details of the actuator mechanism 4 and potentiometer 52, reference is now made to FIG. 2 wherein there is shown the self-aligning motion-transfer device 82 which operatively interconnects or interlocks disc 46 to the potentiometer slider 70, whereby the slider is moved along resistance 62 in proportion to a desired mechanical input or linear movement of the disc 46. The motion-transfer device 82 includes a receiver 84 which is defined by a semi-circular bottom wall portion 86 structurally interconnecting or associated with a plurality of spaced end walls 88 and 90 which define an outwardly opening cavity 96 therebetween. Each end wall 88 and 90 has at least one opening 92 and 94, respectively, extending therethrough and generally in opposed, aligned relationship. A counter-bore or recess 98 is disposed in the inner surface of side wall 88 and has a complementary configuration which is adapted to slidably receive and guide the enlarged end portion 100 of slider 70. The enlarged end portion 100 has a greater cross-sectional area than the one end portion of slider 70. End wall 88 has a slot 102 communicating with and extending from opening 92 to and intersecting an outer edge of end wall 88. Thus, slot 102 is constructed and arranged to slidably receive the opposite end portion of slider 70 which extends outwardly from savity 60. A first outer sonical surface 104 of the enlarged end portion 100 emanates from an apex which substantially coincides with the longitudinal axis of slider 70. The conical surface 104 diverges outwardly from the apex toward said one end of slider 70. The conical surface 104 has a recess 106 which substantially coincides with the apex. The recess 106 is constructed and arranged to rotatably receive at least one anti-friction bearing 108 in revolving contact with the wall of recess 106. Preferably, recess 106 is formed about a center having a radius which is at least equal to the radius of the respective complementary anti-friction bearing 108 which is disposed therein, thereby permitting bearing 108 to rotate about its own axes; however, the location of the center of recess 106 is arranged in such a manner that the diameter of bearing 108 is greater than the axial depth of recess 106. Thus, a portion of bearing 108 extends outwardly from the outer rim of recess 106 and engages one of the substantially smooth surfaces 50 which is disposed on one side of disc 46. As shown more clearly in FIG. 3, the bearing 108 could be retained within recess 106 by deforming the outer edge 130 or rim inwardly; however, other conventional means could be satisfactorily employed.

The other end wall 90 carries a boss 110 which has a passageway 112 extending therethrough and disposed in a substantially aligned relationship with openings 92 and 94. The inner end portion 114 of passageway 112, remote from end wall 90, is constructed and arranged to slidably receive and movably support end portion 116 of elongate, movable plunger 118. The opposite end 120, of passageway 112, is internally threaded for allowing a threaded engagement with externally threaded abutment member or adjusting screw 122; thus, adjustment of member 122 within the passageway 112 effectively regulates the reciprocal movement of plunger 118 within a predetermined and limited range of travel. Moreover, it is in keeping within the inventive concept to employ other conventional adjusting means for adjusting the reciprocal movement of plunger 118.

A second, outer, conical surface 124 is disposed on the enlarged end portion 125 of plunger 118 and is inclined outwardly from its apex (which apex substantially coincides with the longitudinal axis of plunger 118). The enlarged end portion 125 has a greater cross-sectional area than the other end portion 116 of plunger 118. Conical surface 124 diverges outwardly from its apex toward the opposite end portion 116 and its positioned in opposed relationship to the first conical surface 104. A recess 126 substantially coincides with the apex and is constructed and arranged to rotatably receive at least one anti-friction bearing 128 in revolving contact with the inner wall of recess 126. In the preferred embodiment, recess 126 is fabricated about a center having a radius which is at least equal to the radius of the respective complementary anti-friction bearing 128 which is disposed therein, thereby allowing bearing 128 to rotate about its own axes. Moreover, the center of recess 126 is positioned in such a manner that the diameter of bearing 128 is greater than the axial depth of recess 126. Therefore, a portion of bearing 128 extends outwardly beyond the outer rim of recess 126 and engages the other substantially smooth surface 50 which is disposed on the opposite side of disc 46. The bearing 128 is generally retained within the recess 126 by deforming the outer rim or edge of recess 126 inwardly in the same manner described above with respect to bearing 108 and recess 106 of the first conical surface; however, other conventional means could be utilized with equal effectiveness.

A coil or compression spring 130 surrounds boss 110 and the opposite end 116 of plunger 118. One end of the spring bears against the inner surface of endwall 90 and the opposite end bears against a surface of enlarged end portion 125. Thus, spring 130 constantly, yieldably urges both anti-friction bearings 108 and 128 toward and into a motion transfer engaging relationship with the one and the other mirror-like surfaces 50, on opposite sides of disc 46.

In operation, fluid pressure control means 14 selectively establishes a desired pressure differential between fluid zones 18 and 20 for reciprocating piston 12 and associated shaft assembly 26 and 28 in one or another direction, thereby moving interconnected control surfaces of an aircraft. For example, if it should be necessary to move piston 12 to the left, fluid pressure is applied, by conventional means, through conduit 22 into fluid zone 18 and fluid pressure is exhausted simultaneously from fluid zone 20, through conduit 24. The resultant leftward movement forces potentiometer plunger 70, which is in continuous engagement with disc 46, to the left. This leftward movement varies the number of coils of wire forming variable resistance 62 which remain in the conventional potentiometer circuit, and this variation in electrical resistance is translated into a corresponding linear displacement of rod 30 which indicates the relative position of the cooperating aricraft control surface.

The main advantage obtained from the present inventive concept is that there is no moment or eccentric forces placed upon the potentiometer slider 70. The anti-friction bearing 108 is biased toward and engages the smooth mirror-like surface 50 on one side of disc 46; thus, an angular rotation of the rod 36, due to variations in manufacturing tolerances, will create substantially no moment on slider 70 as the bearing 108 will merely rotate about its own axes or smoothly slide over mirror-like surface 50. This sliding movement of the bearing 108, across mirror surface 50, will create only a negligible moment as there is substantially only a point contact between the anti-friction ball bearing 108 and surface 50 and the coefficient of friction therebetween is greatly minimized by the specific construction and arrangement of the bearing 108 and smooth surface 50. Likewise, there is substantially only a point contact between anti-friction bearing 128 and smooth surafce 50 on the opposite side of disc 46. Another feature of the present motion transfer mechanism is that the disc 46 is secured to the rod 34 in such a manner that if spring 130 breaks or loses its preload only an insignificant predetermined amount of slop or play is introduced as error to the electrical follow-up system. This provides for a failure without total loss of the system. In addition, a plurality of potentiometers or electrical follow-up units may be circumferentially disposed about disc 46, and the number of such units is limited only by their size and the compactness required.

While only one embodiment of the invention has been described in detail herein and shown in the accompanying drawing, it will be evident that various further modifications are possible in the arrangement and construction of its components without departing from the scope of the invention.

What is claimed is:

1. A self-aligning motion-transfer device comprising:
   a shaft assembly so constructed and arranged for reciprocal movement along a longitudinal axis;
   means for supporting the shaft assembly for permitting both linear displacement and rotary movement relative to said suporting means;
   means for applying a substantially directed force to the shaft assembly for effecting reciprocal movement thereof;
   apparatus for monitoring the linear displacement of the shaft assembly, including means having a movable portion for varying the magnitude of an electromotive force in proportion to the linear displacement of the shaft assembly;
   a source of electromotive force electrically connected to the apparatus for monitoring the linear displacement of the shaft assembly; and
   biasing means operatively connecting the shaft assembly to the movable portion, for constantly, yieldably urging said movable portion toward the shaft assembly and into motion transfer relationship therewith for permitting movement of the shaft assembly relative to said movable portion.

2. The self-aligning motion-transfer device recited in claim 1, wherein the apparatus for monitoring the linear displacement of the shaft assembly further includes:
   a housing having at least one inner wall portion for defining a cavity therein, said inner wall portion having at least one opening extending therethrough;
   a variable resistance element fixedly attached to the housing and disposed within the confines of the cavity;
   an elongate movable slider having one end disposed within the confines of the cavity, with the opposite end so constructed and arranged for extending outwardly through the side wall opening and into engagement with a portion of the shaft assembly, said one end of the slider having at least one portion extending radially outward therefrom and into electrical, sliding-contact relationship with the resistance element; and means for movably supporting the slider in a substantially spaced, parallel relationship with respect to the resistance element, for permitting movement of the slider substantially parallel to the resistance element.

3. The self-aligning motion-transfer device recited in claim 2, wherein the biasing means constantly yieldably urges the opposite end of the movable slider toward the portion of the shaft assembly and into a motion transfer relationship therewith and for permitting movement of the portion of the shaft assembly relative to the slider.

4. The self-aligning motion-transfer device recited in claim 3, wherein:

the opposite end of the elongate movable slider is provided with an enlarged end portion having a greater cross-sectional area than the one end portion, said slider having a first annular conical surface disposed on the outer surface of the enlarged opposite end portion, said first conical surface diverging from the apex toward the one end portion, said first conical surface having a recess adjacent the apex for receiving a first anti-friction bearing means; and a first anti-friction bearing means rotatably disposed within the recess, said bearing means having a portion extending outwardly from the recess and into revolving contact with the portion of the shaft assembly.

5. The self-aligning motion-transfer device recited in claim 4, further including; means for retaining the anti-friction bearing means within the recess.

6. The self-aligning motion-transfer device recited in claim 4, therein the biasing means yieldably connecting the shaft assembly portion to the movable slider includes; an elongate movable plunger having an enlarged one end portion of greater cross-sectional area than the opposite end portion, said enlarged end portion having a second annular conical surface disposed in opposed relationship to the first annular conical surface on the slider and diverging from the apex toward said opposite end portion, said second conical surface having a recess adjacent the apex for receiving a second anti-friction bearing means;

a second anti-friction bearing means rotatably positioned within the recess, said bearing means having a portion extending outwardly from the recess and into revolving contact with the shaft assembly portion; and means for movably supporting the elongate plunger.

7. The self-aligning motion-transfer device recited in claim 6, wherein the biasing means for yieldably urging the slider toward the shaft assembly further includes:

a receptacle having spaced, opposed, end walls and a bottom wall portion, said bottom wall portion being structurally associated with the end walls for defining an outwardly opening cavity therebetween, one end wall having an opening extending therethrough, said one end wall having a slot communicating with and extending from said opening to an outer edge portion of the one end wall, said opening and associated slot slidably receiving the movable slider.

8. The self-aligning motion-transfer device recited in claim 6, further including; means for retaining the second anti-friction bearing means within the recess disposed on the second conical surface.

9. The self-aligning motion-transfer device of claim 7, wherein said bottom wall is provided with a substantially semi-circular configuration in cross-section.

10. The self-aligning motion-transfer device recited in claim 7, further including:

the other end wall of the receptacle having at least one opening extending therethrough, said opening being disposed in a substantially aligned relationship with the opening in the one end wall;

a boss carried by the other end wall, said boss having a passageway extending therethrough and said passageway being disposed in a substantially aligned relationship with the opening in the other end wall, one end portion of the passageway being disposed remote from the other side wall and slidably receiving and movably supporting the elongate plunger; and means for adjusting the reciprocal movement of the plunger within a predetermined and limited range of travel.

11. The self-aligning motion-transfer device recited in claim 10, wherein the adjusting means is operatively associated with the other end portion of the passageway, adjacent the other end wall of the receptacle.

12. The self-aligning motion-transfer device recited in claim 11, said adjusting means comprising:

the other end portion of the passageway being internally threaded; and an externally threaded, elongate, abutment member threadedly engaging the complementary threads of the internally threaded passageway for limiting reciprocal movement of the plunger with a predetermined range.

13. The motion-transfer device recited in claim 1, wherein said shaft assembly includes a shaft having opposite ends, a reaction member fixedly secured to the shaft adjacent one end thereof and movable therewith, said reaction member extending radially outward from the shaft and into engagement with the movable portion of the apparatus.

14. The motion-transfer device recited in claim 13, wherein the reaction member is provided with at least two substantially radially extending, side wall portions, each side wall portion having a substantially smooth, radially extending surface disposed adjacent the outer peripheral edge thereof.

15. The motion-transfer device recited in claim 13, wherein the reaction member is a substantially rigid disc having a greater outer diameter than the outer diameter of the shaft.

16. The motion-transfer device recited in claim 15, wherein each side of the rigid disc is provided with a substantially smooth, mirror-like, radially extending surface disposed adjacent the outer peripheral edge of said disc, with said surfaces being concentrically disposed about the longitudinal axis of the shaft.

17. A self-aligning motion-transfer device comprising:

a shaft assembly so constructed and arranged for reciprocal movement along a longitudinal axis:

means for supporting the shaft assembly for both linear displacement and rotary movement relative to said supporting means;

means for applying a substantially axially directed force to the shaft assembly for effecting reciprocal movement thereof;

means for monitoring the linear displacement of the shaft assembly, including means for varying the magnitude of an electromotive force in proportion to the linear displacement of the shaft assembly;

a source of electromotive force electrically connected to the means for monitoring the linear displacement of the shaft assembly; and biasing means yieldably connecting the shaft assembly to the means for monitoring the linear displacement of the shaft assembly, for permitting rotation of the shaft assembly relative to the means for monitoring the linear displacement of the shaft assembly for preventing damage to the shaft assembly and to the means for monitoring linear displacement.

18. A self-aligning motion-transfer device comprising:

a shaft assembly so constructed and arranged for reciprocal movement along a longitudinal axis, said shaft assembly including a shaft having opposite ends, a reaction member fixedly secured to the shaft and extending radially outwardly therefrom and movable therewith;

means for supporting the shaft assembly for both linear displacement and rotary movement relative to said supporting means;

means for applying a substantially axially directed force to the shaft assembly for effecting reciprocal movement thereof;

a potentiometer for varying the magnitude of an electromotive force in proportion to the linear displacement of the shaft assembly for monitoring the linear displacement of the shaft assembly, said potentiometer including a variable resistance construction comprising at least one electrical resistance element operatively associated with a movable slider having at least one end portion in sliding-contact relationship with said resistance element, said slider being so constructed and arranged for reciprocal movement relative to said resistance element, and the opposite end portion of the slider operatively engaging the reaction member; and biasing means yieldably connecting the reaction member ot the movable slider, said biasing means yieldably urging the slider toward the shaft member and into a motion transfer relationship with the outwardly extending portion for permitting movement of the shaft relative to the slider.

References Cited

UNITED STATES PATENTS

| | | | |
|---|---|---|---|
| 2,904,766 | 9/1959 | McMillan | 338—176 |
| 3,020,508 | 2/1962 | Zuehlke et al. | 338—176 X |

MILTON KAUFMAN, Primary Examiner

PO-1050
(5/69)

UNITED STATES PATENT OFFICE
CERTIFICATE OF CORRECTION

Patent No. 3,470,749      Dated October 7, 1969

Inventor(s) William A. Lansing

It is certified that error appears in the above-identified patent and that said Letters Patent are hereby corrected as shown below:

Column 1, lines 67-68, the words "to prevent destruction of the rod," should be omitted. Column 2, line 24, the word "displacemen" should read -- displacement --. Column 4, line 57, the word "savity" should read -- cavity --; line 58, the word "sonical" should read -- conical --. Column 5, line 29, the word "its" should read -- is --. Column 6, line 20, the word "surafce" should read -- surface --; line 44, the word -- axially -- should appear after "substantially". Column 10, line 4, the word "ot" should read -- to --.

SIGNED AND
SEALED
MAY 19 1970

(SEAL)
Attest:

Edward M. Fletcher, Jr.
Attesting Officer

WILLIAM E. SCHUYLER, JR.
Commissioner of Patents